US012658633B2

(12) United States Patent
Amini et al.

(10) Patent No.: US 12,658,633 B2
(45) Date of Patent: Jun. 16, 2026

(54) PASSIVE STRUCTURES FOR REDUCING CORROSION IN A CONNECTOR

(71) Applicant: Apple Inc., Cupertino, CA (US)

(72) Inventors: Mahmoud R. Amini, Redwood City, CA (US); Eric B. Wankoff, San Francisco, CA (US); Nikhil S. Pansare, Santa Clara, CA (US); Ibuki Kamei, San Jose, CA (US); Samira Chizari, San Jose, CA (US); Peter J. Cameron, Scotts Valley, CA (US)

(73) Assignee: Apple Inc., Cupertino, CA (US)

(*) Notice: Subject to any disclaimer, the term of this patent is extended or adjusted under 35 U.S.C. 154(b) by 139 days.

(21) Appl. No.: 18/372,566

(22) Filed: Sep. 25, 2023

(65) Prior Publication Data

US 2024/0106161 A1 Mar. 28, 2024

Related U.S. Application Data

(60) Provisional application No. 63/537,767, filed on Sep. 11, 2023, provisional application No. 63/409,633, filed on Sep. 23, 2022.

(51) Int. Cl.

| | |
|---|---|
| ***H01R 13/52*** | (2006.01) |
| ***H01R 13/03*** | (2006.01) |
| ***H01R 13/502*** | (2006.01) |

(52) U.S. Cl.

CPC ........... *H01R 13/521* (2013.01); *H01R 13/03* (2013.01); *H01R 13/502* (2013.01); *H01R 13/5216* (2013.01)

(58) Field of Classification Search

CPC ......................... H01R 13/6683; H01R 13/631; H01R 13/187; H01R 13/5202; H01R 13/533;

(Continued)

(56) References Cited

U.S. PATENT DOCUMENTS 8,920,197 B2 * 12/2014 Tziviskos ............ H01R 13/405 439/660

9,335,355 B2 5/2016 Menzel et al.

(Continued)

FOREIGN PATENT DOCUMENTS

CN 203983639 U 12/2014

CN 211208754 U 8/2020

(Continued)

OTHER PUBLICATIONS

Unpublished U.S. Appl. No. 18/244,836, filed Sep. 11, 2023, titled "Liquid and Connection Detection", 59 pages.

(Continued)

*Primary Examiner* — Abdullah A Riyami
*Assistant Examiner* — Nader J Alhawamdeh
(74) *Attorney, Agent, or Firm* — Kilpatrick Townsend & Stockton LLP

(57) ABSTRACT

Connector structures that can help to reduce corrosion of contacts in a connector receptacle and can reduce liquid ingress into an electronic device that houses the connector receptacle. An example can increase an effective width between adjacent contacts. This and other examples can force dendritic growth to occur in a location where it can be at least partially cleared by the insertion of a corresponding connector into the connector receptacle.

19 Claims, 8 Drawing Sheets

(58) Field of Classification Search
CPC .... H01R 13/6277; H01R 13/639; G01K 1/12; G01K 1/143; G01K 1/08; G01K 1/16; G01K 1/14; Y02T 10/70; Y02T 10/7072
See application file for complete search history.

(56) References Cited

U.S. PATENT DOCUMENTS

| | | | | |
|---|---|---|---|---|
| 9,825,410 | B2 | 11/2017 | Scritzky et al. | |
| 9,991,640 | B2 | 6/2018 | Tziviskos et al. | |
| 10,236,609 | B2 * | 3/2019 | Tziviskos | H01R 12/79 |
| 10,658,797 | B2 | 5/2020 | Andre et al. | |
| 11,658,443 | B2 | 5/2023 | Ashcroft et al. | |
| 2013/0288520 | A1 | 10/2013 | Simmel et al. | |
| 2014/0120778 | A1 | 5/2014 | Yu et al. | |
| 2016/0268722 | A1 * | 9/2016 | Tsai | H01R 13/5202 |
| 2017/0302037 | A1 * | 10/2017 | Yao | H01R 24/60 |
| 2017/0358895 | A1 | 12/2017 | Chung | |
| 2018/0090884 | A1 | 3/2018 | Jeon et al. | |
| 2018/0337489 | A1 * | 11/2018 | Zhao | H01R 13/5219 |
| 2020/0259298 | A1 | 8/2020 | Tyrrell et al. | |
| 2020/0319675 | A1 | 10/2020 | Beckham et al. | |
| 2024/0106161 | A1 * | 3/2024 | Amini | H01R 13/502 |

FOREIGN PATENT DOCUMENTS

| | | | |
|---|---|---|---|
| CN | 215869984 | U | 2/2022 |
| JP | 2008146865 | A | 6/2008 |
| JP | 2015204288 | A | 11/2015 |
| KR | 20150061406 | A | 6/2015 |

OTHER PUBLICATIONS

Korean Patent Application No. 10-2023-0123085, "Office Action", Feb. 28, 2025, 5 pages.

United Kingdom Patent Application No. GB2314145.0 , "Combined Search and Examination Report", Mar. 8, 2024, 4 pages.

U.S. Appl. No. 18/244,836, "Non-Final Office Action", Sep. 10, 2025, 8 pages.

U.S. Appl. No. 18/244,836, Notice of Allowance, Jan. 28, 2026, 7 pages.

Korean Patent Application No. 10-2024-0122902, "Office Action", Feb. 13, 2026, 13 pages.

* cited by examiner

PASSIVE STRUCTURES FOR REDUCING CORROSION IN A CONNECTOR

CROSS-REFERENCES TO RELATED APPLICATIONS

The present application claims the benefit of and priority to U.S. provisional application 63/537,767, filed Sep. 11, 2023, and U.S. provisional application 63/409,633, filed Sep. 23, 2022, which are incorporated by reference.

BACKGROUND

The number of types of electronic devices that are commercially available has increased tremendously the past few years and the rate of introduction of new devices shows no signs of abating. Devices such as tablet computers, laptop computers, all-in-one computers, desktop computers, cell phones, storage devices, wearable-computing devices, portable media players, portable computing devices, navigation systems, monitors, audio devices, remotes, adapters, and others have become ubiquitous.

Some of these electronic devices can receive data and power through cables that are connected to power adapters, host devices, or other data and power sources. These cables can have a connector insert that can be inserted into a connector receptacle in the electronic device. The connector receptacle can include contacts that can form electrical connections with corresponding contacts in the connector insert.

Occasionally moisture can enter a connector receptacle. This moisture can be sweat from a user working out. The moisture can be from liquids spilled on or near the electronic device housing the connector receptacle. The moisture can come from the electronic device being submerged. Whatever the source, this moisture can corrode the contacts in the connector receptacle. This corrosion can be in the form of dendritic growth that can cause electrical connections between adjacent contacts. This moisture can also breach the connector receptacle structure and enter the electronic device, thereby causing further damage.

Accordingly, it can be desirable to be able to reduce the corrosion of contacts in a connector receptacle due to the presence of moisture. It can also be desirable to prevent leakage through the connector receptacle into the electronic device.

Thus, what is needed are connector structures that can help to reduce corrosion of contacts in a connector receptacle and can reduce liquid ingress into an electronic device housing the connector receptacle.

SUMMARY

Accordingly, embodiments of the present invention can provide connector structures that can help to reduce corrosion of contacts in a connector receptacle and can reduce liquid ingress into an electronic device housing the connector receptacle. An illustrated embodiment of the present invention can provide passive features that can be formed on a tongue of a connector receptacle. These passive features can include structures that can limit dendritic growth by increasing an effective width between contacts. These passive features can include structures that can force dendritic growth to occur in a location on a connector receptacle tongue where the dendritic growth is likely to be broken and at least partially cleared during insertion of a corresponding connector insert into the connector receptacle. The passive features can include structures that can collect liquid that might appear on the tongue. The passive features can include structures that direct liquid from a first location on the tongue to a second location on the tongue. The passive features can include structures that can protect leading or front edges of contacts such that the contacts are not damaged during insertion of a corresponding connector insert into the connector receptacle. The passive features can include structures that can replace one or more contacts in a plurality of contacts. The replaced contacts can be replaced with a nonconductive version that can lower a current density on adjacent or nearby contacts. The replaced contacts can also or instead be formed of a sacrificial material that can be allowed to corrode in order to protect other contacts on the tongue. The passive features can include structures that can cover portions of one or more contacts to protect them from corrosion. Other features can include characteristics of one or more contacts themselves. For example, portions of one or more contacts can be altered to reduce an electric field between two contacts, thereby reducing corrosion.

Other passive features can help to reduce liquid ingress into an electronic device housing the connector receptacle. These passive features can help to improve a sealing of a backside of a tongue assembly such that liquids that enter the connector receptacle are slowed or prevented from reaching an interior of the electronic device.

Various structures can be used to limit dendritic growth by increasing an effective width between contacts. That is, such a structure can increase effective path length from one contact to an adjacent contact. For example, a rib or other raised portion can be placed in a gap between adjacent contacts at one or more locations on a tongue of a connector receptacle. The ribs can extend along some or all of the lengths of the adjacent contacts. The ribs can extend beyond the leading edge of the adjacent contacts in the direction towards a front edge of the tongue. The ribs can extend to, or short of, the leading edge of the adjacent contacts in the direction towards a front edge of the tongue. Each rib can be a raised portion that extends from a recessed portion in a gap between contacts and has a height that is lower than the height of the adjacent contacts, the same or about the same as the height of the adjacent contacts, or higher than the height the of the adjacent contacts. Any dendritic growth between adjacent contacts would need to grow from a first contact, and then up and over the rib to the second contact, which is an increased path length from the first contact to the second contacts. This can increase the effective width between the first contact and the second contact.

These ribs and other structures can force dendritic growth to occur in a location on a connector receptacle tongue where the dendritic growth is likely to be broken and at least partially cleared during insertion of a corresponding connector insert into the connector receptacle. For example, where the passive feature is a rib or other raised portion between two contacts, dendritic growth from a first one of the contacts can grow up and over the rib to a second one of the contacts. If a height of the rib is above or near a height of the first and second contacts, the dendritic growth can be at least partially removed, wiped, or cleared by the insertion of a corresponding connector insert into the connector receptacle. For example, a housing, ground contact, shields, or other structure of the corresponding connector insert can physically slide along a top surface of the rib, thereby breaking up and dislodging at least some of the dendritic growth.

Other contaminants can gather on these ribs and other structures on a connector receptacle tongue. For example, corrosion product, such as conductive contamination from contacts, shields, and other portions of connector inserts that are inserted in the connector receptacle, can be left behind to accumulate. Other corrosion products or conductive contamination from external sources, or from contacts, ground pads, and other structures internal to the connector receptacle can be left behind to accumulate. The portion of the corrosion product or conductive contamination that is located on a rib or other structure can be at least partially cleared during insertion of a corresponding connector insert into the connector receptacle. This partial clearing can be beneficial by helping to prevent conductive debris from forming a path between adjacent contacts. This can help to keep the connector receptacle functional even in the presence of corrosion product or conductive contamination from internal or external sources.

Each rib or other raised portion can form a first trench between the rib and a first contact and a second trench between the rib and a second contact. In these and other embodiments of the present invention, trenches can be formed between adjacent contacts to increase an effective path length between them. In these and other embodiments of the present invention, other combination of trenches and ribs can be formed between adjacent contacts to increase an effective path length between them. The trenches can collect liquid on the tongue thereby increasing resistance between contacts and reducing dendritic growth and other corrosion. These trenches can also distribute liquid across a tongue thereby reducing a current density across the tongue, which can further help to reduce corrosion.

These ribs and trenches can be used in conjunction with various materials and coatings to further reduce corrosion. For example, hydrophobic coatings or materials can be used to move liquid on a tongue away from a first location. Hydrophilic coatings or materials can be used to attract liquid to a second location on the tongue. Similarly, the trenches formed between contacts, such as those formed between a rib and a contact, can provide a capillary effect to move liquid between locations on the tongue. In these and other embodiments of the present invention, this liquid can be guided by the coatings, materials, or trenches to one or more liquid-detect contacts on a surface on or near the tongue. For example, hydrophobic coatings or materials can be used to move liquid away from a front edge of a tongue, and hydrophilic coatings or materials can be used to move liquid towards a liquid-detect contact that is between contacts and near a ground pad, between a number of contacts and the ground pad, or at other locations on the tongue.

These and other embodiments of the present invention can provide protection for leading edges of one or more contacts on the tongue of a connector receptacle. This protection can reduce wear at the contact leading edges that could otherwise cause corrosion of the contacts. These leading edges can be covered with plastic, nylon, or other protective material to prevent wear from occurring when a corresponding connector inserted is inserted into the connector receptacle. The plastic protective material can have a sloped edge to prevent chipping or damage to the plastic during an insertion.

These and other embodiments can provide structures that can replace one or more contacts in a plurality of contacts. For example, where a connector receptacle is a USB Type-C connector that is used for charging, the transmit and receive contact pairs might not be needed and can be replaced with nonconductive versions. These nonconductive replacements can create dams that can reduce a thickness of a liquid at a top surface of the replacement contacts, thereby lowering a current density at adjacent or nearby contacts. The replaced contacts can also or instead be formed of a sacrificial material that can be allowed to corrode in order to protect other contacts on the tongue. That is, these sacrificial contacts can be corroded by chlorine and chloride in a liquid on the tongue, thereby reducing the remaining amount of chlorine and chloride that can corrode the actual contacts on the tongue.

These and other embodiments can provide structures that can cover portions of one or more contacts to protect them from corrosion. For example, contacts on a tongue of a connector receptacle can include a contacting portion that electrically and physically connects to contacts of a connector insert when the connector insert is inserted into the connector receptacle. The contacts can further have rear portions, where the contacting portions are between the rear portions and a leading edge of the tongue. The rear portions of the contacts can be angled or stepped towards a midplane of the tongue. This can allow the rear portions to be covered by a molding such that the rear portions are protected from corrosion.

These corrosion resistant features can include characteristics of one or more contacts themselves. For example, portions of one or more contacts can be narrowed to increase a spacing between contact portions. This can reduce an electric field between the two contact portions, thereby reducing corrosion at those locations.

These and other embodiments of the present invention can include structures to help prevent leakage into the electronic device housing the connector receptacle. In one example, the contacts can be sealed by a tongue molding to prevent leakage. A rear of the connector can include features that form channels, where the channels provide for an even distribution of epoxy to better seal the connector receptacle and prevent leakage.

Embodiments of the present invention can provide connector structures for connector receptacles that are compliant with various standards such as Universal Serial Bus (USB), USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

In these and other embodiments of the present invention, contacts, ground pads, and other conductive portions of a connector receptacle can be formed by stamping, progressive stamping, forging, metal-injection molding, deep drawing, machining, micro-machining, computer-numerically controlled (CNC) machining, screw-machining, 3-D printing, clinching, or other manufacturing process. The conductive portions can be formed of stainless steel, steel, copper, copper-titanium, phosphor-bronze, brass, nickel gold, copper-nickel, silicon alloys, or other material or combination of materials. They can be plated or coated with nickel, gold, or other material.

The nonconductive portions, such as tongue moldings, ribs, and other structures, can be formed using insert molding, injection molding, or other molding, 3-D printing, machining, or other manufacturing process. The nonconductive portions can be formed of silicon or silicone, polyimide, glass nylon, polycarbonate, rubber, hard rubber, plastic, nylon, liquid-crystal polymers (LCPs), ceramics, thermoplastic elastomers (TPE) or other nonconductive material or combination of materials.

Embodiments of the present invention can provide connector receptacles that can be located in various types of devices, such as tablet computers, laptop computers, desktop computers, all-in-one computers, cell phones, storage devices, wearable-computing devices, portable computing devices, portable media players, navigation systems, monitors, remotes, adapters, and other devices.

While embodiments of the present invention are well-suited to use in connector receptacles, these and other embodiments of the present invention can be utilized in connector inserts and other types of connectors as well.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
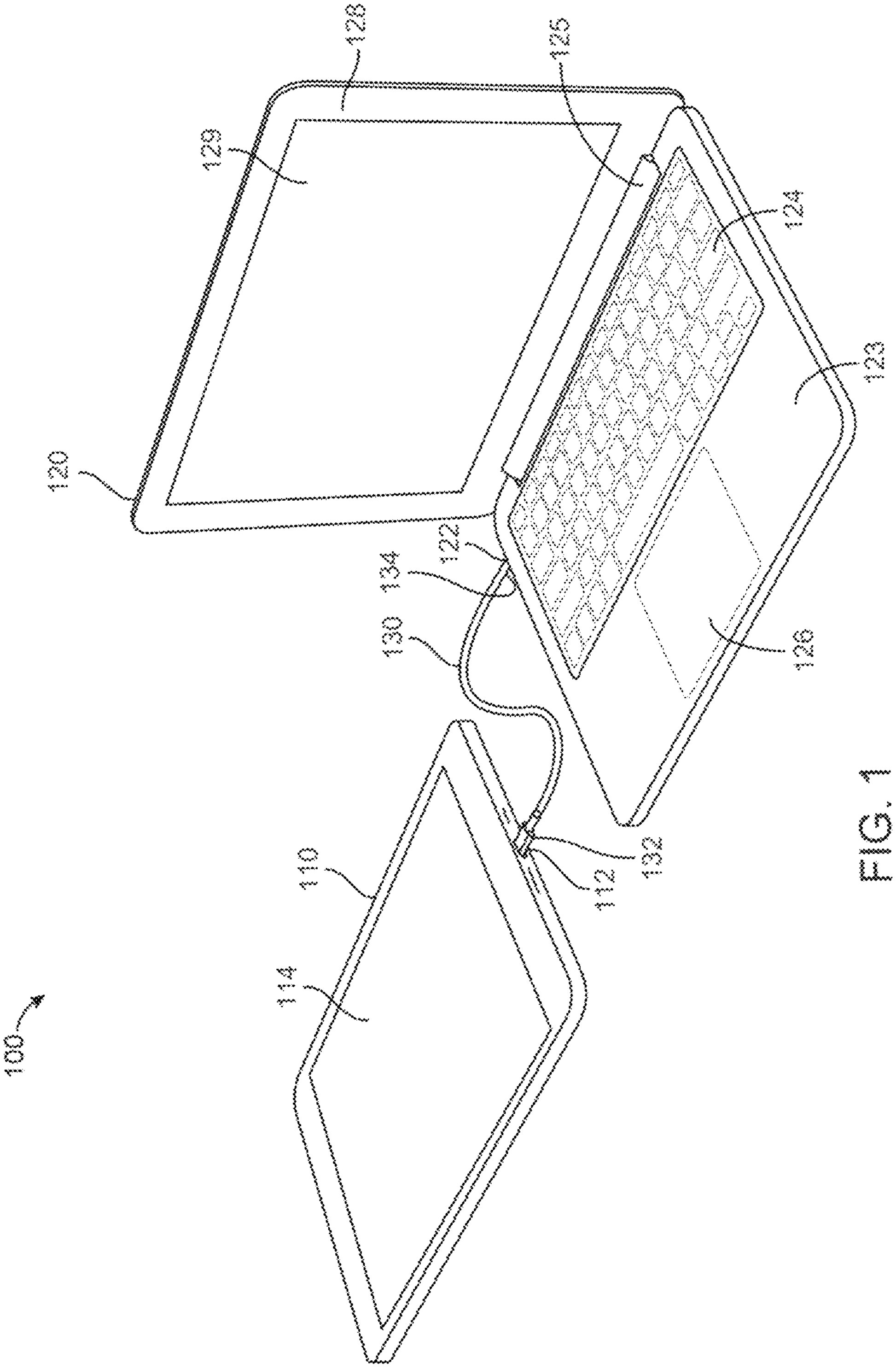
FIG. 1 illustrates an electronic system that can be improved by the incorporation of embodiments of the present invention.

FIG. 1 illustrates an electronic system that can be improved by the incorporation of embodiments of the present invention. Electronic system 100 can include handheld computing device 110 and portable computing device 120. Handheld computing device 110 can include connector receptacle 112 and screen 114. Portable computing device 120 can include base 123 supporting keyboard 124 and touchpad 126. Portable computing device 120 can further include lid 128 supporting screen 129. Base 123 can be joined to lid 128 by hinge 125. Base 123 can include connector receptacle 122.

Cable 130 can convey power and data between handheld computing device 110 and portable computing device 120. Cable 130 can include a connector insert 132 at a first end that can be plugged into connector receptacle 112 of handheld computing device 110. Cable 130 can further include connector insert 134 the can be plugged into connector receptacle 122 of portable computing device 120.

In this example, electronic system 100 is shown as including handheld computing device 110 and portable computing device 120. In these and other embodiments of the present invention, electronic system 100 can include other types of devices. Also, while handheld computing device 110 is shown as a table computer and portable computing device 120 is shown as a laptop computer, either or both can be other types of devices, such as desktop computers, all-in-one computers, cell phones, storage devices, wearable-computing devices, audio devices, storage cases for audio devices, portable computing devices, portable media players, navigation systems, audio devices, monitors, remotes, adapters, and other devices.

Embodiments of the present invention can provide connector receptacles, such as connector receptacle 112 and connector receptacle 122, and connector inserts, such as connector insert 132 and connector insert 134, that are compliant with various standards such as Universal Serial Bus (USB), USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

On occasion, moisture can enter a connector receptacle, such as connector receptacle 112 or connector receptacle 122. For example, handheld computer device 110 can be used during exercise and sweat can enter connector receptacle 112. A liquid can be spilled and can enter connector receptacle 112 on handheld computing device 110 or portable computing device 120. Handheld computing device 110 can be inadvertently submerged, or other events can happen to either handheld computing device 110 or portable computing device 120. This moisture can cause corrosion of contacts in connector receptacle 112, connector receptacle 122, or other connector receptacle.

It can be desirable to limit or prevent damage connector receptacle 112 or connector receptacle 122, as well as handheld computing device 110, portable computing device 120, or other electronic devices housing connector receptacle 112, connector receptacle 122, or other connector receptacle. Accordingly, embodiments of the present invention can provide features that can limit or prevent corrosion of contacts in connector receptacle 112, connector receptacle 122, or other connector receptacle. Embodiments of the present invention can further provide features that can limit or prevent the ingress of liquid into handheld computing device 110, portable computing device 120, or other electronic device.

More specifically, embodiments of the present invention can provide passive features that can prevent contact corrosion and liquid ingress. These passive features can be extremely cost-effective, requiring only changes to molds, stamping procedures, or other modifications to process steps. These passive features can be used on their own or along with active features, such as liquid-detection contacts and circuits, which can consume additional resources as compared to passive features. For example, these passive features can be used to guide liquid from a first location on a tongue to a second location on a tongue, where an active feature such as a liquid-detection contact is placed at the second location. Examples of these passive features are shown in the following figures.

Figure 2A:
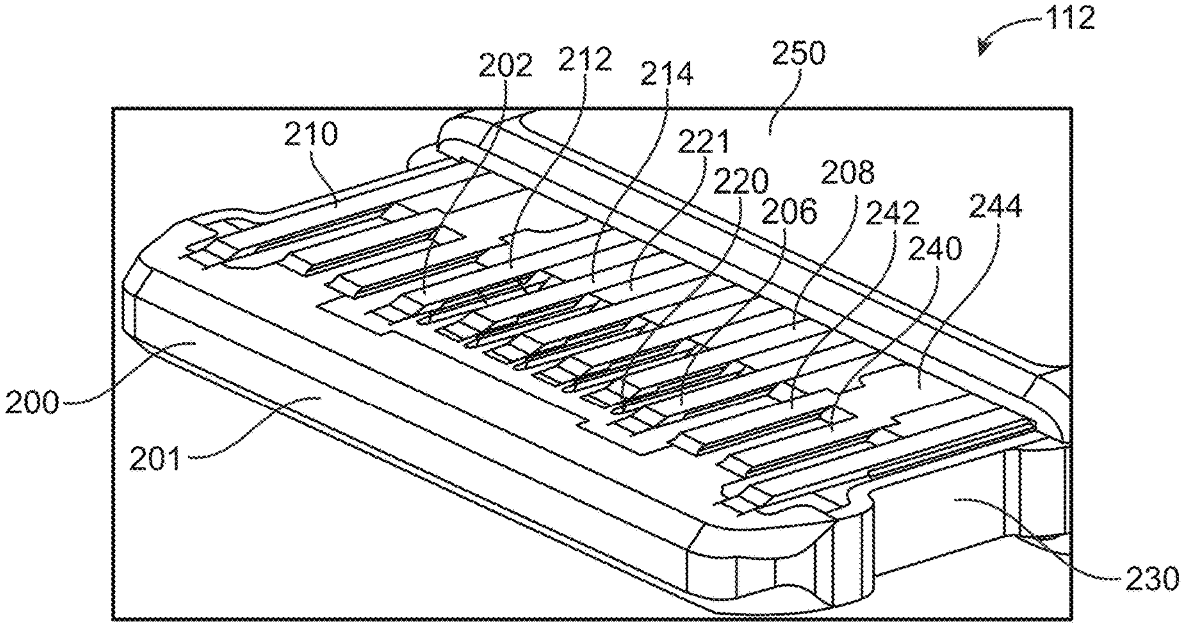
FIG. 2A and FIG. 2B illustrate passive features that can reduce corrosion of contacts on a tongue according to an embodiment of the present invention.
Figure 2B:
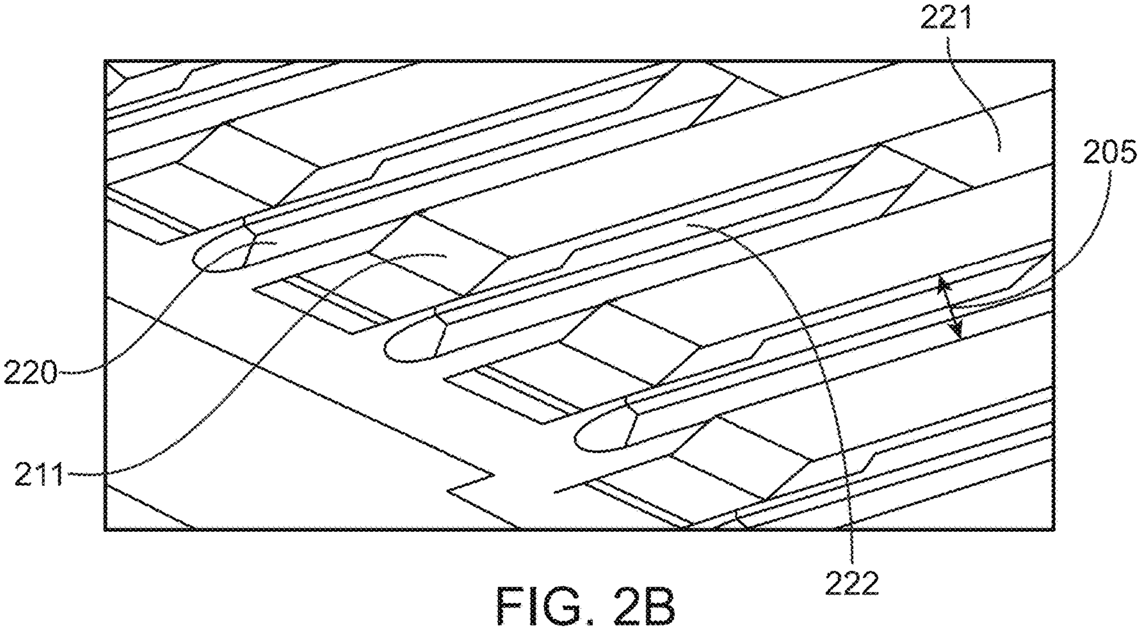

FIG. 2A and FIG. 2B illustrate passive features that can reduce corrosion of contacts on a tongue according to an embodiment of the present invention. FIG. 2B is a closer view to illustrate features shown in FIG. 2A. Tongue 200 can be located in a passage of a housing (not shown) of connector receptacle 112, though tongue 200 can be located in a passage of a housing of connector receptacle 122 (shown in FIG. 1) or other connector receptacle. Tongue 200 can support ground pads 250 on a top and bottom side. Tongue 200 can include side ground contacts 230 on each side. Tongue 200 can support contacts 202 on a top side and contacts 204 (shown in FIG. 5) on a bottom side. Each set of adjacent contacts 202 and 204 (referred to here as contacts 202 for simplicity) can be separated by a gap, such as gap 205 (best shown in FIG. 2B), where gap 205 can be the same or different for different pairs of adjacent contacts 202. In this example, tongue 200 can be a tongue in a Universal Serial Bus Type-C connector receptacle. Contacts 202 can include two ground contacts 210, two VBUS contacts 212, and VCON and CC contacts 214. Tongue 200 can include similar contacts and other structures on the bottom side, though reference is made here to the top side only for simplicity.

Tongue 200 can include structures to limit dendritic growth by increasing an effective width between contacts 202. That is, such a structure can increase effective path length from one contact 202 to an adjacent contact 202. In this example, a rib 220 (best shown in FIG. 2B) or other raised portion can be placed in gap 205 between at least some of the adjacent contacts 202. Ribs 220 can extend along some or all of the lengths of adjacent contacts 202. Each rib 220 can be a raised portion that extends vertically from a recessed portion in the gap between contacts 202 and has a height that is lower than the height of adjacent contacts 202, the same or about the same as the height of adjacent contacts 202, or higher than the height the of adjacent contacts 202.

In some circumstances, a likely path for corrosion in the form of dendritic growth can be from VBUS contact 212 to CC contact 214. This can be caused by power being applied to VBUS contact 212 while CC contact 214 provides a resistive path to ground. This arrangement can provide a current path at a strong electric field, which can generate corrosion. Accordingly, a rib 220 can be placed between VBUS contact 212 and CC contact 214. When rib 220 is present, dendritic growth (not shown) between adjacent VBUS contact 212 and CC contact 214 needs to grow through the path from VBUS contact 212, and then up and over rib 220 to CC contact 214. This is an increased path length from the VBUS contact 212 to the CC contact 214 as compared to rib 220 being absent. Rib 220 can increase the effective width between VBUS contact 212 and the CC contact 214 over the straight-line width of gap 205.

Ribs 220 can force dendritic growth to occur in a location on a connector receptacle tongue where the dendritic growth is likely to be broken and at least partially cleared during insertion of a corresponding connector insert (such as connector insert 132, connector insert 134, both shown in FIG. 1, or other connector insert) into connector receptacle 112 or other connector receptacle that includes tongue 200. For example, dendritic growth from VBUS contact 212 can grow up and over rib 220 to CC contact 214. If a height of rib 220 is above or near a height of VBUS contact 212 and CC contact 214, the dendritic growth can be at least partially removed, wiped, or cleared by the insertion of a corresponding connector insert. For example, a housing, ground contact, shield, shell, or other structure (not shown) of the corresponding connector insert can physically slide along a top surface of rib 220, thereby breaking up and dislodging at least some of the dendritic growth.

Other contaminants can gather on ribs 220 and other structures on connector receptacle tongue 200. For example, corrosion product, such as conductive contamination from contacts, shields, and other portions of connector inserts (not shown) that are inserted in connector receptacle 112, can be left behind to accumulate. Other corrosion products or conductive contamination from external sources, or from contacts 202, ground pads 250, and other structures internal to connector receptacle 112 can be left behind to accumulate. The portion of the corrosion product or conductive contamination that is located on a rib 220 or other structure can be at least partially cleared during insertion of a corresponding connector insert into connector receptacle 112. This partial clearing can be beneficial by helping to prevent conductive debris from forming a path between adjacent contacts 202. This can help to keep connector receptacle 112 functional even in the presence of corrosion product or conductive contamination from internal or external sources.

Ribs 220 can extend along some or all of the lengths of adjacent contacts 202. In this example, contacts 202 can have a contacting portion 206 and a rear portion 208. Contacting portions 206 can physically and electrically connect to a corresponding connector insert when the connector insert and connector receptacle 112 or other connector receptacle that includes tongue 200 are mated. Contacting portions 206 can be between rear portions 208 and a front edge 201 tongue 200. Regions 221 can fill gap 205 between adjacent contacts 202, while ribs 220 can extend from regions 221 towards leading edges 211 of contacts 202. In these and other embodiments of the present invention, ribs 220 can extend short of leading edges 211, to leading edges 211, or beyond leading edges 211 towards front edge 201 of tongue 200. Regions 221 can be increased in length, reduced in length, or regions 221 can be omitted and ribs 220 can extend to ground pad 250.

Each rib 220 can form trenches 430 (shown in FIG. 4) between rib 220 and adjacent contacts 202. For example, trenches 430 can be formed between rib 220 and VBUS contact 212 and between rib 220 and CC contact 214. In these and other embodiments of the present invention, these or other trenches can be formed between adjacent contacts 202 to increase an effective path length between them. In these and other embodiments of the present invention, other combination of trenches 430 and ribs 220 can be formed between adjacent contacts 202 to increase an effective path length between them. Trenches 430 can collect liquid that is present on tongue 200 thereby increasing resistance caused by liquid between contacts 202 and reducing dendritic growth and other corrosion. Trenches 430 can also distribute liquid across tongue 200 thereby reducing a current density across tongue 200, which can further help to reduce corrosion.

Ribs 220 and trenches 430 can be used in conjunction with various materials and coatings to further reduce corrosion. For example, hydrophobic coatings or materials (not shown) can be used to move liquid on tongue 200 away from a first location. Hydrophilic coatings or materials (not shown) can be used to attract liquid to a second location on tongue 200. Trenches 430 formed in gaps 205 between contacts 202, such as those formed between a rib 220 and a contact 202, can provide a capillary effect to move liquid between locations on tongue 200. In these and other embodiments of the present invention, this liquid can be guided by the coatings, materials, or trenches 430 to one or more liquid-detect contacts (not shown) on a surface on or near tongue 200. For example, hydrophobic coatings or materials can be used to move liquid away from front edge 201 of tongue 200, and hydrophilic coatings or materials can be used to move liquid towards one or more liquid-detect contacts (not shown) that are between contacts 202 and near ground pad 250, between a number of contacts 202 and ground pad 250, or at other locations on tongue 200.

These and other embodiments can provide structures that can replace one or more contacts 202. For example, where a connector receptacle is a USB Type-C connector that is used for charging, the transmit and receive pairs of contacts might not be needed and can be replaced with replacement contact 240 and replacement contact 242. Replacement contact 240 and replacement contact 242 can be nonconductive, that is they can be molded of a plastic, nylon, glass-filled nylon, or other material. Replacement contact 240 and replacement contact 242 can create dams that can reduce a thickness of a liquid at a top surface of replacement contact 240 and replacement contact 242, thereby lowering a current density at adjacent or nearby contacts 202. For example, replacement contact 240 and replacement contact 242 can increase a resistive path through a liquid covering an area of tongue 200 around replacement contact 240 and replacement contact 242. This can reduce current flow from one of the VBUS contacts 212 to ground contact 210. Replacement contact 240 and replacement contact 242 can extend from molded region 244.

Instead of nonconductive contacts, replacement contact 240 and replacement contact 242 can also or instead be formed of a metal, such as sacrificial material that can be allowed to corrode in order to protect other contacts 202 on the tongue. That is, sacrificial replacement contact 240 and replacement contact 242 can be corroded by chlorine and chloride in a liquid on the tongue, thereby reducing the remaining amount of chlorine and chloride that remains to corrode the actual contacts 202 on the tongue. The sacrificial replacement contact 240 and replacement contact 242 can be made of a material that is more electrochemically active than a second material used to form contacts 202. Replacement contact 240 and replacement contact 242 can be formed of gold, palladium, iridium, silver, nickel, ruthenium, copper, tin, platinum, or other material.

The passive features provided by embodiments of the present invention can include structures that can cover portions of one or more contacts 202 to protect them from corrosion. As described above, contacts 202 on tongue 200 of connector receptacle 112 can include contacting portions 206 that electrically and physically connect to contacts of a connector insert when the connector insert is inserted into connector receptacle 112. Contacts 202 can further have rear portions 208, where the contacting portions 206 are between the rear portions 208 and a front edge 201 of tongue 200. Rear portions 208 of contacts 202 can be angled or stepped towards a midplane of tongue 200, where the deflection can increase closer to ground pad 250. This can allow some or all of rear portions 208 to be covered by plastic molding of tongue 200 such that rear portions 208 of contacts 202 are protected from corrosion.

These corrosion resistant features can include characteristics of one or more contacts 202 themselves. For example, rear portions 208 of one or more contacts can be narrowed to increase a spacing between rear portions 208 of contacts 202. This can reduce an electric field between two contacts 202 at rear portions 208, thereby reducing corrosion at rear portions 208.

Additional protective material 222 can be added along some or all of sides of some or all of contacts 202. This additional protective material 222 can protect contacts 202 from corrosion due to liquids that can pool in trenches 430.

In this example, contacts 202 on a top side of the tongue are shown. In these and other embodiments of the present invention, a same or similar set of contacts 204 can be located on a bottom side of the tongue, and those contacts 204 can include each of the features shown with respect to contacts 202. Also, ribs 220, trenches 430, replacement contact 240 and replacement contact 242, and other passive (and active) features shown or disclosed herein with respect to a top side of tongue 200 can be placed or formed on a bottom side of tongue 200 as well.

Figure 3A:
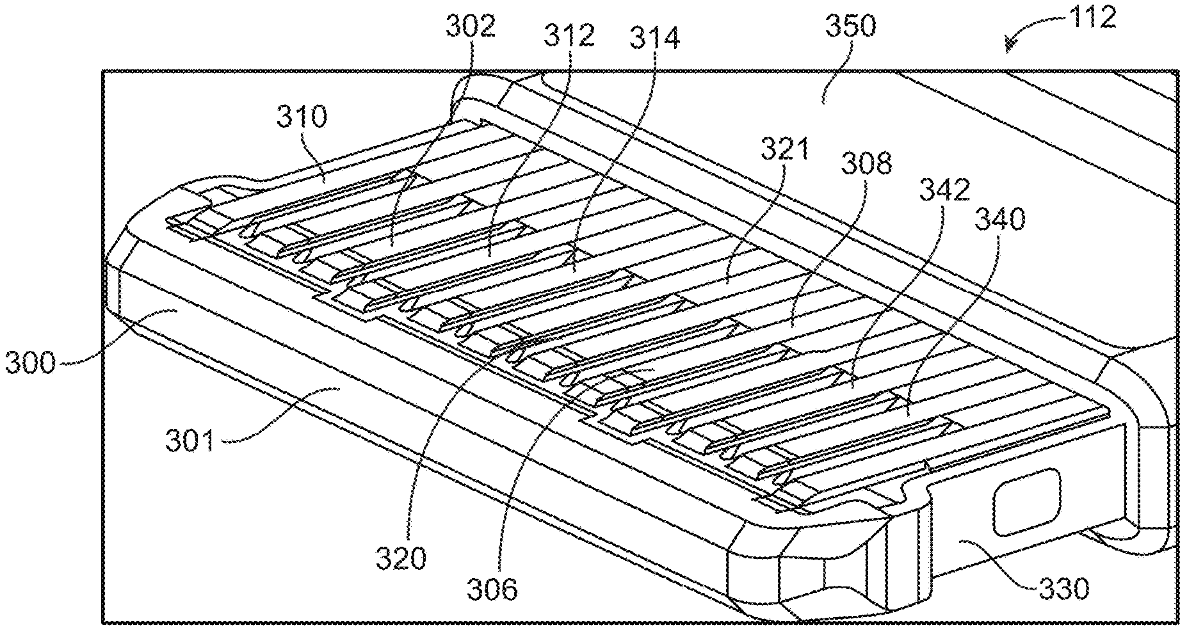
FIG. 3A and FIG. 3B illustrate additional passive features that can reduce corrosion of contacts on a tongue according to an embodiment of the present invention.
Figure 3B:
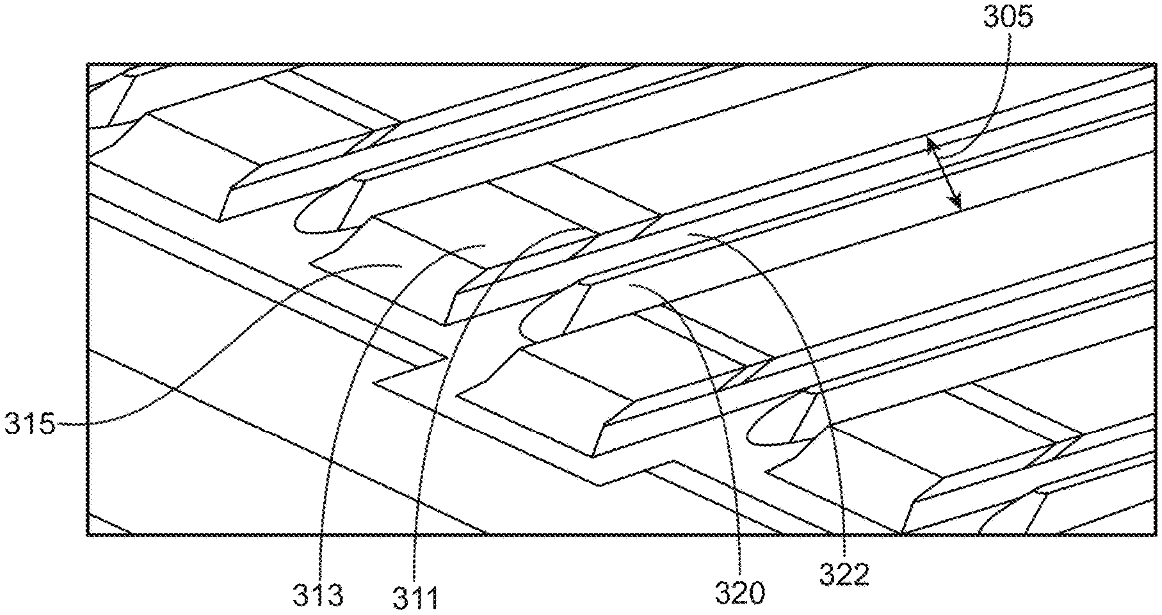

FIG. 3A and FIG. 3B illustrate additional passive features that can reduce corrosion of contacts on a tongue according to an embodiment of the present invention. FIG. 3B is a closer view to illustrate features shown in FIG. 3A. Tongue 300 can be located in a passage of a housing (not shown) of connector receptacle 112, though tongue 300 can be located in a passage of a housing of connector receptacle 122 (shown in FIG. 1) or other connector receptacle. Tongue 300 can support ground pads 350 on a top and bottom side. Tongue 300 can include side ground contacts 330 on each side. Tongue 300 can support contacts 302 on a top side and contacts 304 (shown in FIG. 5) on a bottom side. Each set of adjacent contacts 302 and 304 (referred to here as contacts 302 for simplicity) can be separated by a gap, such as gap 305 (best shown in FIG. 3B), where gap 305 can be the same or different for different pairs of adjacent contacts 302. In this example, tongue 300 can be a tongue in a Universal Serial Bus Type-C connector receptacle. Contacts 302 can include two ground contacts 310, two VBUS contacts 312, and VCON and CC contacts 314. Contacts 302 can also include transmit and receive pairs of contacts 340 and 342. Tongue 300 can include similar contacts and other structures on the bottom side, though reference is made here to the top side only for simplicity.

These and other embodiments of the present invention can provide protection for leading edges of one or more contacts 302 on the tongue of connector receptacle 112, connector receptacle 122, or other connector receptacle. This protection can reduce wear at the contact leading edges 311 which could otherwise cause corrosion of contacts 302. These leading edges 311 can be covered with plastic, nylon, or other protective material 313 to prevent wear from occurring when a corresponding connector insert (not shown) is inserted into the connector receptacle. The plastic protective material 313 can have a sloped edge 315 to prevent chipping or damage to the plastic protective material 313 during an insertion.

Additional protective material 322 can be added along some or all of sides of some or all of contacts 302. This additional protective material 322 can protect contacts 302 from corrosion due to liquids that can pool in trenches 430.

As with tongue 200 (shown in FIG. 2) above, tongue 300 can include structures to limit dendritic growth by increasing an effective width between contacts 302. That is, such a structure can increase effective path length from one contact 302 to an adjacent contact 302. In this example, a rib 320 (best shown in FIG. 3B) or other raised portion can be placed in gap 305 between at least some of the adjacent contacts 302. Ribs 320 can extend along some or all of the lengths of adjacent contacts 302. Each rib 320 can be a raised portion that extends vertically from a recessed portion in the gap between contacts 302 and has a height that is lower than the height of adjacent contacts 302, the same or about the same as the height of adjacent contacts 302, or higher than the height the of adjacent contacts 302.

In some circumstances, a likely path for corrosion in the form of dendritic growth can be from VBUS contact 312 to CC contact 314. This can be caused by power being applied to VBUS contact 312 while CC contact 314 provides a resistive path to ground. This arrangement can provide a current path at a strong electric field, which can generate corrosion. Accordingly, a rib 320 can be placed between VBUS contact 312 and CC contact 314. When rib 320 is present, dendritic growth (not shown) between adjacent VBUS contact 312 and CC contact 314 needs to grow through the path from VBUS contact 312, and then up and over rib 320 to CC contact 314. This is an increased path length from the VBUS contact 312 to the CC contact 314 as compared to rib 320 being absent. Rib 320 can increase the effective width between VBUS contact 312 and the CC contact 314 over the straight-line width of gap 305.

Ribs 320 can force dendritic growth to occur in a location on a connector receptacle tongue where the dendritic growth is likely to be broken and at least partially cleared during insertion of a corresponding connector insert (such as connector insert 132, connector insert 134, both shown in FIG. 1, or other connector insert) into connector receptacle 112 or other connector receptacle that includes tongue 300. For example, dendritic growth from VBUS contact 312 can grow up and over rib 320 to CC contact 314. If a height of rib 320 is above or near a height of VBUS contact 312 and CC contact 314, the dendritic growth can be at least partially removed, wiped, or cleared by the insertion of a corresponding connector insert. For example, a housing, ground contact, shield, shell, or other structure (not shown) of the corresponding connector insert can physically slide along a top surface of rib 320, thereby breaking up and dislodging at least some of the dendritic growth.

Other contaminants can gather on ribs 320 and other structures on connector receptacle tongue 300. For example, corrosion product, such as conductive contamination from contacts, shields, and other portions of connector inserts (not shown) that are inserted in connector receptacle 112, can be left behind to accumulate. Other corrosion products or conductive contamination from external sources, or from contacts 302, ground pads 350, and other structures internal to connector receptacle 112 can be left behind to accumulate. The portion of the corrosion product or conductive contamination that is located on a rib 320 or other structure can be at least partially cleared during insertion of a corresponding connector insert into connector receptacle 112. This partial clearing can be beneficial by helping to prevent conductive debris from forming a path between adjacent contacts 302. This can help to keep connector receptacle 112 functional even in the presence of corrosion product or conductive contamination from internal or external sources.

Ribs 320 can extend along some or all of the lengths of adjacent contacts 302. In this example, contacts 302 can have a contacting portion 306 and a rear portion 308. Contacting portions 306 can physically and electrically connect to contacts in a corresponding connector insert when the connector insert and connector receptacle 112 or other connector receptacle that includes tongue 300 are mated. Contacting portions 306 can be between rear portions 308 and a front edge 301 tongue 300. Regions 321 can fill gap 305 between adjacent contacts 302, while ribs 320 can extend from regions 321 towards leading edges 311 of contacts 302. In these and other embodiments of the present invention, ribs 320 can extend short of leading edges 311, to leading edges 311, or beyond leading edges 311 towards front edge 301 of tongue 300. Regions 321 can be increased in length, reduced in length, or regions 321 can be omitted and ribs 320 can extend to ground pad 350.

Each rib 320 can form trenches 430 (shown in FIG. 4) between rib 320 and adjacent contacts 302. For example, trenches 430 can be formed between rib 320 and VBUS contact 312 and between rib 320 and CC contact 314. In these and other embodiments of the present invention, these or other trenches can be formed between adjacent contacts 302 to increase an effective path length between them. In these and other embodiments of the present invention, other combination of trenches 430 and ribs 320 can be formed between adjacent contacts 302 to increase an effective path length between them. Trenches 430 can collect liquid that is present on tongue 300 thereby increasing resistance caused by liquid between contacts 302 and reducing dendritic growth and other corrosion.

Ribs 320 and trenches 430 can be used in conjunction with various materials and coatings to further reduce corrosion. For example, hydrophobic coatings or materials (not shown) can be used to move liquid on tongue 300 away from a first location. Hydrophilic coatings or materials (not shown) can be used to attract liquid to a second location on tongue 300. Similarly, trenches 430 formed in gaps 305 between contacts 302, such as those formed between a rib 320 and a contact 302, can provide a capillary effect to move liquid between locations on tongue 300. In these and other embodiments of the present invention, this liquid can be guided by the coatings, materials, or trenches 430 to one or more liquid-detect contacts (not shown) on a surface on or near tongue 300. For example, hydrophobic coatings or materials can be used to move liquid away from front edge 301 of tongue 300, and hydrophilic coatings or materials can be used to move liquid towards one or more liquid-detect contacts (not shown) that are between contacts 302 and near ground pad 350, between a number of contacts 302 and ground pad 350, or at other locations on tongue 300.

The passive features provided by embodiments of the present invention can include structures that can cover portions of one or more contacts 302 to protect them from corrosion. As described above, contacts 302 on tongue 300 of connector receptacle 112 can include contacting portions 306 that electrically and physically connect to contacts of a connector insert when the connector insert is inserted into connector receptacle 112. Contacts 302 can further have rear portions 308, where the contacting portions 306 are between the rear portions 308 and a front edge 301 of tongue 300. Rear portions 308 of contacts 302 can be angled or stepped towards a midplane of tongue 300, such that the deflection can increase towards ground pad 250. This can allow some or all of rear portions 308 to be covered by plastic molding of tongue 300 such that rear portions 308 of contacts 302 are protected from corrosion.

These corrosion resistant features can include characteristics of one or more contacts 302 themselves. For example, rear portions 308 of one or more contacts can be narrowed to increase a spacing between rear portions 308 of contacts 302. This can reduce an electric field between two contacts 302 at rear portions 308, thereby reducing corrosion at rear portions 308.

In this example, contacts 302 on a top side of the tongue are shown. In these and other embodiments of the present invention, a same or similar set of contacts 304 can be located on a bottom side of the tongue, and those contacts 304 can include each of the features shown with respect to contacts 302. Also, ribs 320, trenches 430, and other passive (and active) features shown or disclosed herein with respect to a top side of tongue 300 can be placed on a bottom side of tongue 300 as well.

Figure 4:
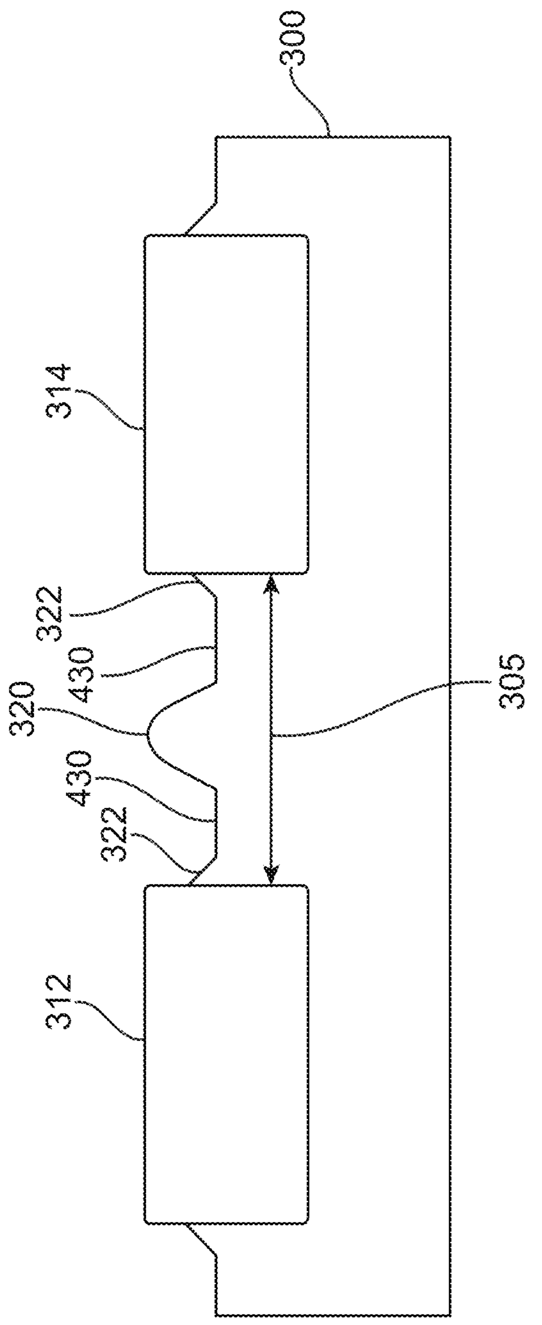
FIG. 4 is a cross-section of passive features that can reduce corrosion of contacts on a tongue according to an embodiment of the present invention.

FIG. 4 is a cross-section of passive features that can reduce corrosion of contacts on a tongue according to an embodiment of the present invention. As shown in FIG. 3 above, rib 320 can be located in gap 305 between VBUS contact 312 and CC contact 314 on tongue 300. Rib 320 can form a trench 430 between rib 320 and each of VBUS contact 312 and CC contact 314. In this example, rib 320 can have a height at or near the height of VBUS contact 312 and CC contact 314, though rib 320 can be shorter or higher than VBUS contact 312 and CC contact 314. Portions of sides of VBUS contact 312 and CC contact 314 (and other contacts 302 and 304) can be coated by additional protective material 322. Additional protective material 322 can help to reduce or prevent corrosion of VBUS contact 312 and CC contact 314 due to liquid pooling in trenches 430.

The presence of rib 320 can increase and effective width of the gap 305. Specifically, the surface contour following the trenches 430 and rib 320 is longer than the straight-line distance shown as gap 305. This surface contour is the path that could be followed by dendritic growth. The slopes of additional protective material 322 can further increase the effective width of gap 305. These features can decrease the likely hood of dendritic growth reaching from one contact to an adjacent contact.

While VBUS contact 312 and CC contact 314 are shown in this example, other contacts can have a rib 320 between them and have the same or similar structure as shown here. Also, tongue 200 can have the same or similar structures between VBUS contact 212 and CC contact 214 (both shown in FIG. 2A.) For example, rib 220 can be located in gap 205 (both shown in FIG. 2B) between VBUS contact 212 and CC contact 214. Rib 220 can form a trench 430 between rib 220 and each of VBUS contact 212 and CC contact 214. Rib 220 can have a height at or near the height of VBUS contact 212 and CC contact 214, though rib 220 can be shorter or higher than VBUS contact 212 and CC contact 214. Portions of sides of VBUS contact 212 and CC contact 214 (and other contacts 202 and 204) can be coated by additional protective material 222. Additional protective material 222 can help to reduce or prevent corrosion of VBUS contact 212 and CC contact 214 due to liquid pooling in trenches 430.

Additional measures can be taken to further improve connector receptacles by reducing or preventing the ingress of moisture into electronic devices housing the connector receptacles. For example, a backside of a tongue assembly can be sealed with epoxy, glue, or other potting material to prevent leakage through the connector receptacle. There can be many obstacles that can hinder or limit such a sealing process. For example, contacts can extend though the backside of the tongue assembly limiting where the epoxy can be directly applied. Also, large regions that are being filled with epoxy can pull the epoxy away from narrower areas. The epoxy can tend to wick along sides of recesses to locations where the epoxy is undesired.

Accordingly, embodiments of the present invention can provide methods, structures, and apparatus that can improve the sealing of a backside of a tongue assembly. Large regions being filled with epoxy can be divided into smaller areas that can be more readily filled. Bosses and other structures can be used to limit the size of areas to be filled. A channel structure can be implemented in a backside of a tongue assembly such that epoxy is routed to locations that would otherwise be hard to reach, such as under contacts. Examples of this are shown in the following figures.

Figure 5:
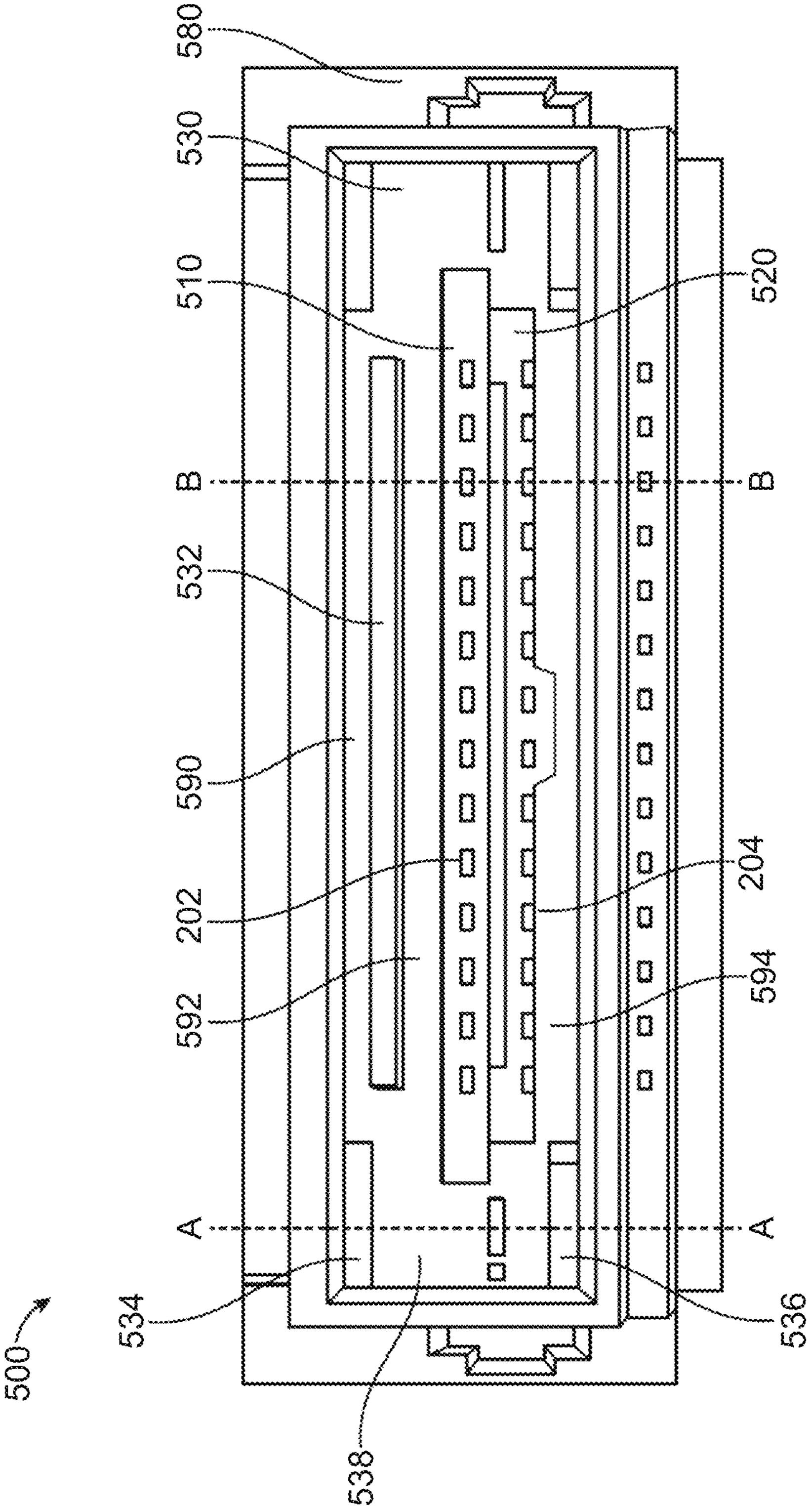
FIG. 5 illustrates a backside of a tongue assembly that includes sealing improvement features according to an embodiment of the present invention.

FIG. 5 illustrates a backside of a tongue assembly that includes sealing improvement features according to an embodiment of the present invention. Tongue assembly 500 can be used in connector receptacle 112, connector receptacle 122 (both shown in FIG. 1) or other connector receptacle. Tongue assembly 500 can support tongue 200 (shown in FIG. 2) or tongue 300 (shown in FIG. 3.) In these following examples, contacts 202 and contacts 204 are shown, though contacts 202 and 204 can be replaced by contacts 302 and contacts 304, respectively, when tongue 300 is supported. Tongue assembly 500 can include top contact housing 510 supporting contacts 202 and bottom contact housing 520 supporting contacts 204. Top contact housing 510 and bottom contact housing 520 can be over molded by molding 530. Molding 530 can be positioned in housing 580.

The backside of tongue assembly shown here can be exposed to an interior region of handheld computing device 110 and portable computing device 120 (both shown in FIG. 1) or other electronic device. It can be desirable to seal this backside to prevent leakage into the electronic device that includes tongue assembly 500. Unfortunately, when large regions are filled with epoxy, the epoxy in narrower areas can be pulled away, leaving gaps in coverage. Accordingly, embodiments of the present invention can include features such as a divider or boss 532, which can separate regions or channel 590 and channel 592 from each other. These narrow regions or channels 590 and 592 can be filled with epoxy in a more consistent manner than one large area. Also, it can be difficult to directly apply epoxy to some regions, such as channel 594, since contacts 204 can block access. Using separate channels, such as channel 590, channel 592, and channel 594, epoxy can be applied to channel 590 and can flow through this channel structure filling the channel 592 and channel 594 with epoxy. Additional features, such as recess 534 and recess 536 can be included, as can raised portions or bosses 538.

Figure 6B:
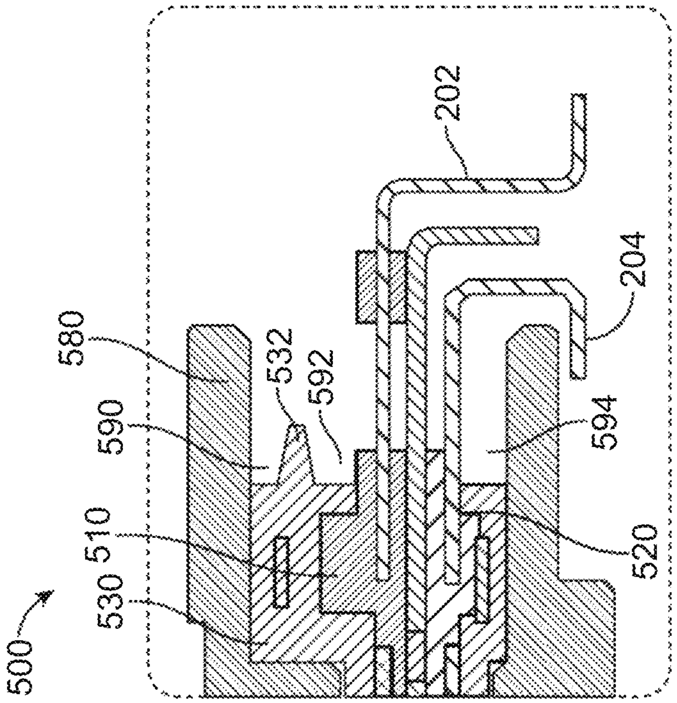
FIG. 6A and FIG. 6B illustrate cross-sections of a backside of a tongue assembly according to an embodiment of the present invention.
Figure 6A:
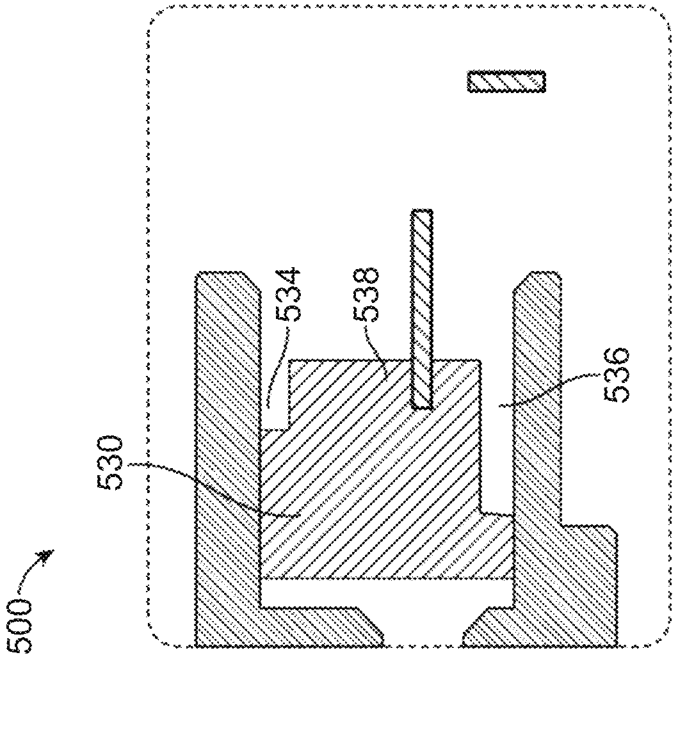

FIG. 6A and FIG. 6B illustrate cross-sections of a backside of a tongue assembly according to an embodiment of the present invention. FIG. 6A illustrates a cross-section of a backside of tongue assembly 500 along cut line AA (shown in FIG. 5.) Molding 530 can include boss 538 having recesses 534 and 536 on each side. Boss 538 can reduce a volume to be filled with epoxy. FIG. 6B illustrates a cross-section of a backside of tongue assembly 500 along cut line BB (shown in FIG. 5.) Top contact housing 510 can support contacts 202 and bottom contact housing 520 can support contacts 204. Molding 530 can be formed around top contact housing 510 and bottom contact housing 520. Molding 530 can be positioned in housing 580. Molding 530 can include elongated boss 532. Elongated boss 532 can separate channel 590 from channel 592. A third channel 594 can be positioned below contacts 204. Epoxy (not shown) can be applied to channel 590 such that the epoxy flows into channels 592 and channel 594, thereby properly sealing a backside of tongue assembly 500. As can be seen, it can be difficult to directly reach channel 590 or channel 594 for the direct application of epoxy since contacts 202 and contacts 204 can be in the way. Using the channel structure including channels above and below contacts 202 and contacts 204 enables good epoxy coverage. Epoxy can be applied to channel 590 using a jet, injection, or other application method.

Figure 7:
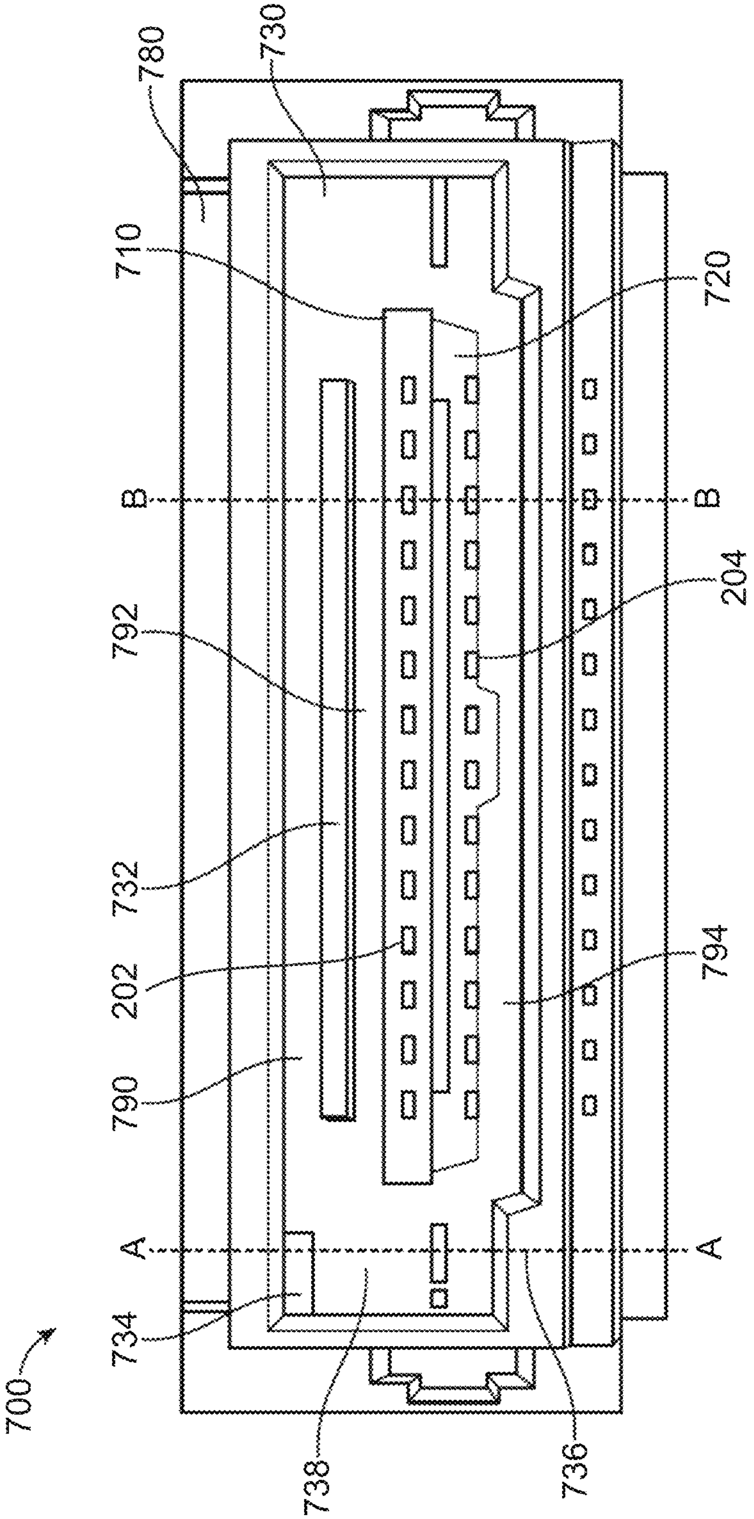
FIG. 7 illustrates a backside of another tongue assembly that includes sealing improvement features according to an embodiment of the present invention.

FIG. 7 illustrates a backside of another tongue assembly that includes sealing improvement features according to an embodiment of the present invention. Tongue assembly 700 can be used in connector receptacle 112, connector receptacle 122 (both shown in FIG. 1) or other connector receptacle. Tongue assembly 700 can support tongue 200 (shown in FIG. 2) or tongue 300 (shown in FIG. 3.) In these following examples, contacts 202 and contacts 204 are shown, though contacts 202 and 204 can be replaced by contacts 302 and contacts 304, respectively, when tongue 300 is supported. Tongue assembly 700 can include top contact housing 710 supporting contacts 202 and bottom contact housing 720 supporting contacts 204. Top contact housing 710 and bottom contact housing 720 can be over molded by molding 730. Molding 730 can be positioned in housing 780.

The backside of tongue assembly shown here can be exposed to an interior region of handheld computing device 110 and portable computing device 120 (both shown in FIG. 1) or other electronic device. It can be desirable to seal this backside to prevent leakage into the electronic device that includes tongue assembly 700. Unfortunately, when large regions are filled with epoxy, the epoxy in narrower areas can be pulled away, leaving gaps in coverage. Accordingly, embodiments of the present invention can include features such as a divider or boss 732, which can separate regions or channels 790 and 792 from each other. These narrower regions or channels 790 and 792 can be filled with epoxy in a more consistent manner than one large area. Also, it can be difficult to directly apply epoxy to some regions, such as channel 794, since contacts 204 can block access. Using separate channels, such as channel 790, channel 792, and channel 794, epoxy can be applied to channel 790 and can flow through this channel structure filling the backside with epoxy. Additional features, such as recess 734 and recess 736 can be included, as can raised portions or bosses 738.

Figure 8B:
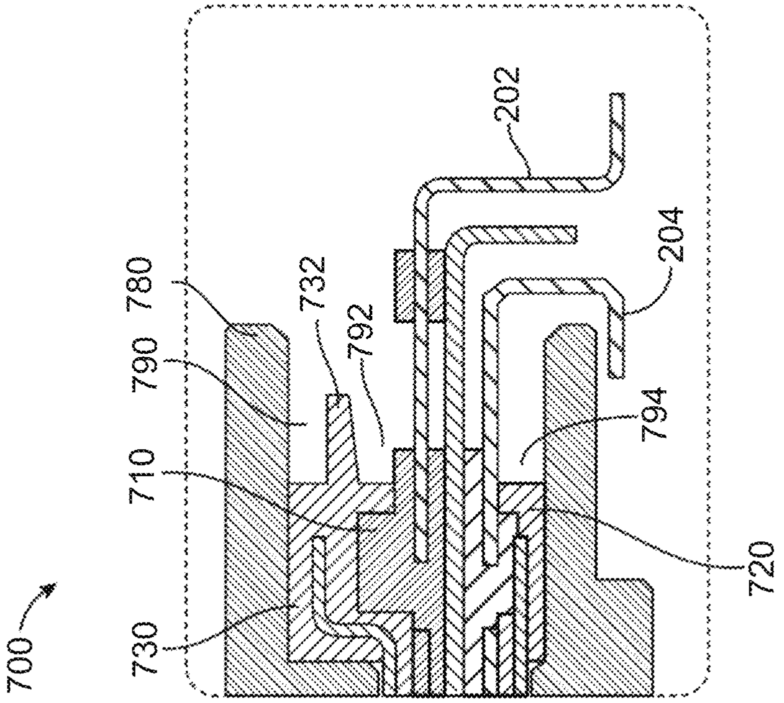
FIG. 8A and FIG. 8B illustrate cross-sections of a backside of a tongue assembly according to an embodiment of the present invention.
Figure 8A:
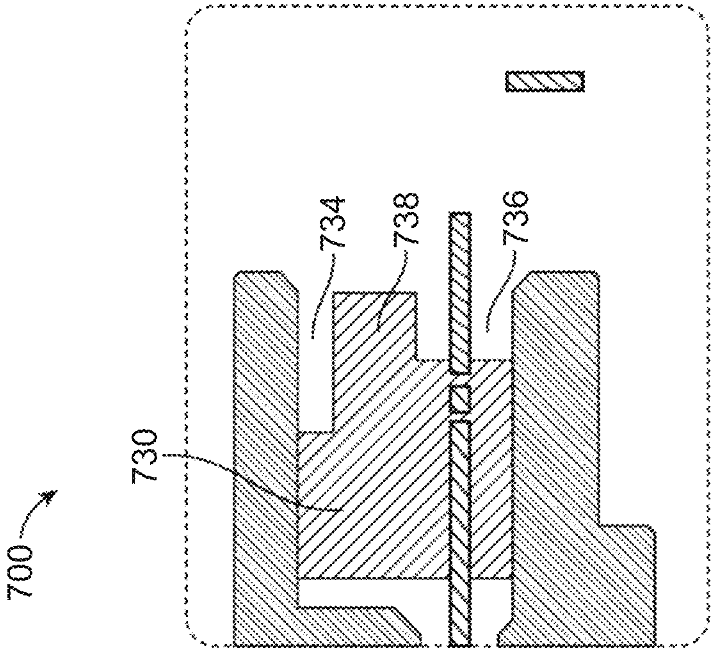

FIG. 8A and FIG. 8B illustrate cross-sections of a backside of a tongue assembly according to an embodiment of the present invention. FIG. 8A illustrates a cross-section of a backside of tongue assembly 700 along cut line AA (shown in FIG. 7.) Molding 730 can include boss 738 having recesses 734 and 736 on each side of boss 738. Boss 738 can reduce a volume to be filled with epoxy. FIG. 8B illustrates a cross-section of a backside of tongue assembly 700 along cut line BB (shown in FIG. 7.) Top contact housing 710 can support contacts 202 and bottom contact housing 720 can support contacts 204. Molding 730 can be formed around top contact housing 710 and bottom contact housing 720. Molding 730 can be positioned in housing 780. Molding 730 can include elongated boss 732. Elongated boss 732 can separate channel 790 from channel 792. A third channel 794 can be positioned below contacts 204. Epoxy can be applied to channel 790 such that the epoxy flows into channels 792 and channel 794, thereby properly sealing a backside of tongue assembly 700. As can be seen, it can be difficult to directly reach channel 790 or channel 794 for the direct application of epoxy since contacts 202 and contacts 204 can be in the way. Using the channel structure including channels above and below contacts 202 and contacts 204 enables good epoxy coverage. Epoxy can be applied to channel 790 using a jet, injection, or other application method.

Embodiments of the present invention can provide connector structures for connector receptacles that are compliant with various standards such as Universal Serial Bus (USB), USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

In these and other embodiments of the present invention, contacts, ground pads, and other conductive portions of a connector receptacle can be formed by stamping, progressive stamping, forging, metal-injection molding, deep drawing, machining, micro-machining, computer-numerically controlled (CNC) machining, screw-machining, 3-D printing, clinching, or other manufacturing process. The conductive portions can be formed of stainless steel, steel, copper, copper-titanium, phosphor-bronze, brass, nickel gold, copper-nickel, silicon alloys, or other material or combination of materials. They can be plated or coated with nickel, gold, or other material.

The nonconductive portions, such as tongue moldings, ribs, and other structures, can be formed using insert molding, injection molding, or other molding, 3-D printing, machining, or other manufacturing process. The nonconductive portions can be formed of silicon or silicone, polyimide, glass nylon, polycarbonate, rubber, hard rubber, plastic, nylon, liquid-crystal polymers (LCPs), ceramics, thermoplastic elastomers (TPE) or other nonconductive material or combination of materials.

Embodiments of the present invention can provide connector receptacles that can be located in various types of devices, such as tablet computers, laptop computers, desktop computers, all-in-one computers, cell phones, storage devices, wearable-computing devices, portable computing devices, portable media players, navigation systems, monitors, remotes, adapters, and other devices.

While embodiments of the present invention are well-suited to use in connector receptacles, these and other embodiments of the present invention can be utilized in connector inserts and other types of connectors as well. Reference numbers are used here in a consistent manner among the various figures.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector receptacle comprising:

a housing having a passage;

a tongue located in the passage;

a first plurality of contacts on a top side of the tongue, the first plurality of contacts including a first contact and a second contact separated by a first gap, wherein the first contact and the second contact each have a top surface above the surface of the top side of the tongue;

a second plurality of contacts on a bottom side of the tongue; and a first structure positioned in the first gap, wherein the presence of the first structure increases an effective width of the first gap, wherein the first structure extends from the surface of the top side of the tongue to at least approximately the top surface of the first contact and the top surface of the second contact.

2. The connector receptacle of claim 1 wherein the first structure positions dendritic growth and corrosion product where it is susceptible to being at least partially cleared when a corresponding connector insert is inserted into the connector receptacle, wherein the corrosion product is generated by contacts on the corresponding connector receptacle.

3. The connector receptacle of claim 1 wherein the first structure includes a first feature to collect liquid.

4. The connector receptacle of claim 1 wherein the first structure includes a first feature to direct liquid from a first location on the surface of the tongue to a second location on a surface of the tongue.

5. The connector receptacle of claim 4 wherein the first location is coated with a hydrophobic coating and the second location is coated with a hydrophilic coating.

6. The connector receptacle of claim 1 wherein the first structure comprises a rib.

7. The connector receptacle of claim 1 wherein the first structure comprises a raised portion extending in the gap along a portion of the length of the first contact and the second contact.

8. The connector receptacle of claim 1 wherein the first contact is formed of metal and a front tip of the first contact is covered with plastic.

9. The connector receptacle of claim 8 wherein the plastic front tip of the first contact is ramped.

10. The connector receptacle of claim 1 further comprising a second structure and a third structure between the first contact and a third contact in the first plurality of contacts, the second structure and the third structure comprising raised portions, wherein the first contact, the second contact, the third contact, the second structure, and the third structure each have approximately a same width.

11. The connector receptacle of claim 1 wherein the first contact includes a rear portion and a contacting portion, the contacting portion between a front edge of the tongue and the rear portion, where the contacting portion physically and electrically connects to a corresponding contact in a connector insert when the connector insert is mated with the connector receptacle, and wherein a width of the rear portion is narrower than a width of the contacting portion.

12. The connector receptacle of claim 1 wherein the connector receptacle is a Universal Serial Bus Type-C connector receptacle.

13. A connector receptacle comprising:

a housing having a passage;

a tongue located in the passage;

a first plurality of contacts on a top side of the tongue, the first plurality of contacts including a first contact and a second contact separated by a first gap, wherein the first gap is level with the top side of the tongue;

a second plurality of contacts on a bottom side of the tongue; and a raised portion extending above the top side of the tongue and in the gap along a portion of the length of the first contact and the second contact.

14. The connector receptacle of claim 13 wherein the raised portion forms a first trench between the first contact and the raised portion and a second trench between the second contact and the raised portion.

15. The connector receptacle of claim 14 wherein a top of the raised portion is at least approximately planar with a top surface of the first contact and a top surface of the second contact such that dendritic growth between the first contact and the second contact is at least partially cleared when a corresponding connector insert is inserted into the connector receptacle.

16. The connector receptacle of claim 15 wherein the raised portion is a rib.

17. A connector receptacle comprising:

a housing having a passage;

a tongue located in the passage;

a first plurality of contacts on a top side of the tongue, the first plurality of contacts including a first contact and a second contact separated by a first gap;

a second plurality of contacts on a bottom side of the tongue; and a raised rib extending in the gap along a portion of the length of the first contact and the second contact, wherein the tongue further comprises a backside, the backside exposed to an internal region of an electronic device housing the connector receptacle, wherein the backside comprises:

molding supporting the first plurality of contacts and the second plurality of contacts; and an elongated boss extending from the backside and between the first plurality of contacts and a top of the backside, wherein the elongated boss divides the backside into a first channel and a second channel.

18. The connector receptacle of claim 17 wherein the first contact includes a rear portion and a contacting portion, the contacting portion between a front edge of the tongue and the rear portion, where the rear portion is angled or stepped towards a midplane of the tongue, and wherein the rear portion is covered by a molding.

19. The connector receptacle of claim 18 wherein the backside further comprises a third channel between the second plurality of contacts and a bottom of backside.

* * * * *